No. 857,879. PATENTED JUNE 25, 1907.
M. J. HILL.
ANIMAL TRAP.
APPLICATION FILED FEB. 26, 1907.
3 SHEETS—SHEET 2.
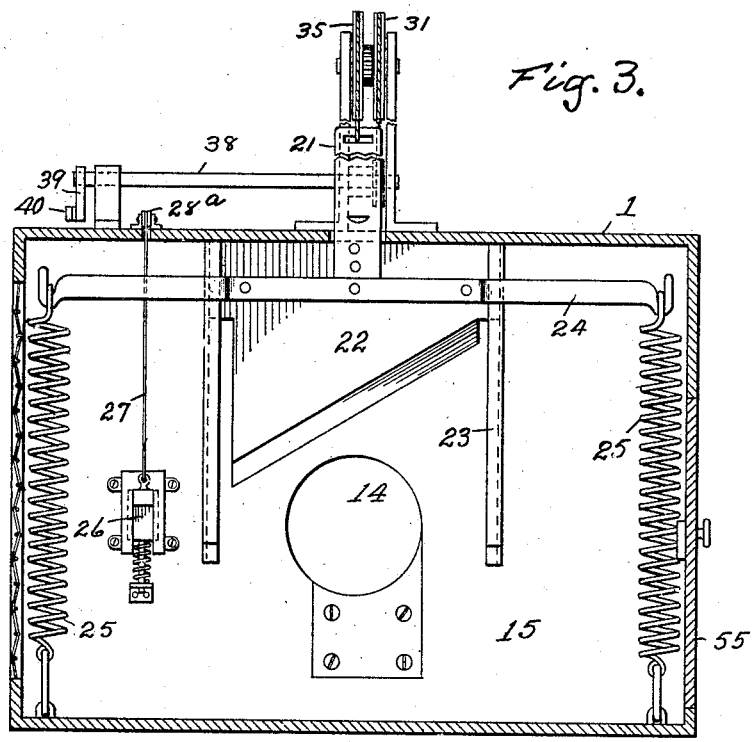
Fig. 3.
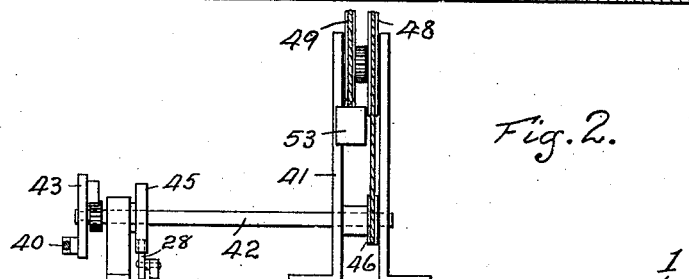
Fig. 2.
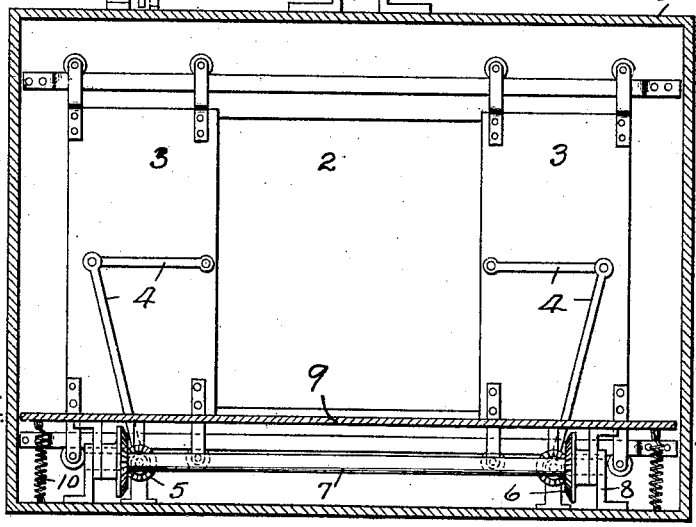
Milton J. Hill,
Inventor
Witnesses No. 857,879. PATENTED JUNE 25, 1907.
M. J. HILL.
ANIMAL TRAP.
APPLICATION FILED FEB. 26, 1907.

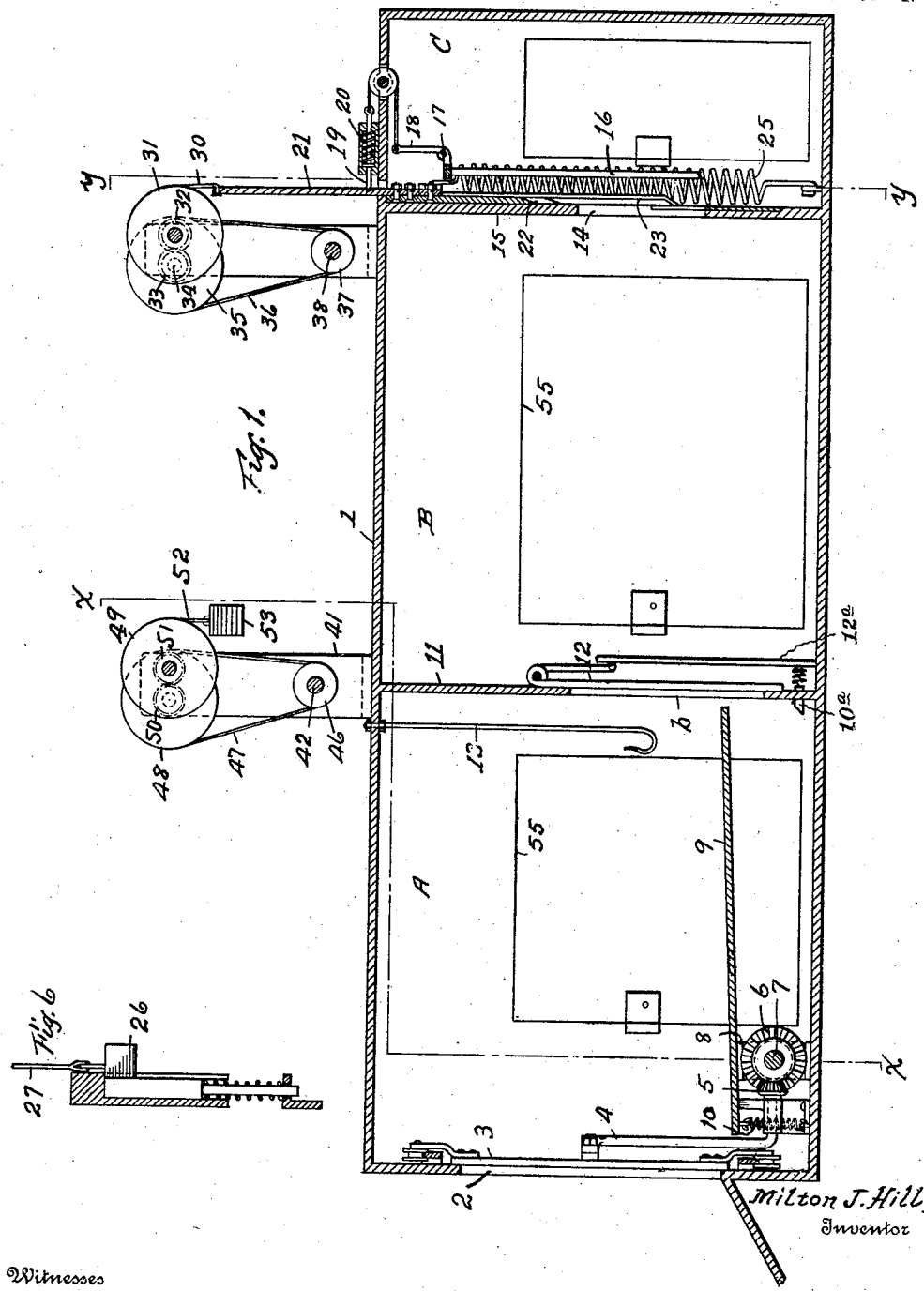

3 SHEETS—SHEET 3.

Witnesses
Dan'l Webster, Jr.
J. O'R. Kelly.

Inventor
Milton J. Hill,
By
Attorney

THE NORRIS PETERS CO., WASHINGTON, D. C.

UNITED STATES PATENT OFFICE.

MILTON J. HILL, OF VIRGINSVILLE, PENNSYLVANIA.

ANIMAL-TRAP.

No. 857,879.  Specification of Letters Patent.  Patented June 25, 1907.

Application filed February 26, 1907. Serial No. 359,499.

*To all whom it may concern:*

Be it known that I, MILTON J. HILL, a citizen of the United States, residing at Virginsville, in the county of Berks and State of Pennsylvania, have invented certain new and useful Improvements in Animal-Traps, of which the following is a specification.

This invention relates to improvements in animal traps.

The object of the invention is to provide a trap in which the animal will first be entrapped and then automatically executed.

The device consists of a box like body comprising first a trap compartment, then a retaining compartment, and last a killing compartment.

The device is operated automatically by the animal and a number of animals may be caught in succession without attention from the owner as the trap is set by the animal passing from the first named compartment into the retaining compartment.

The invention is more fully described in the following specification and clearly illustrated in the accompanying drawings, in which:—

Figure 4:
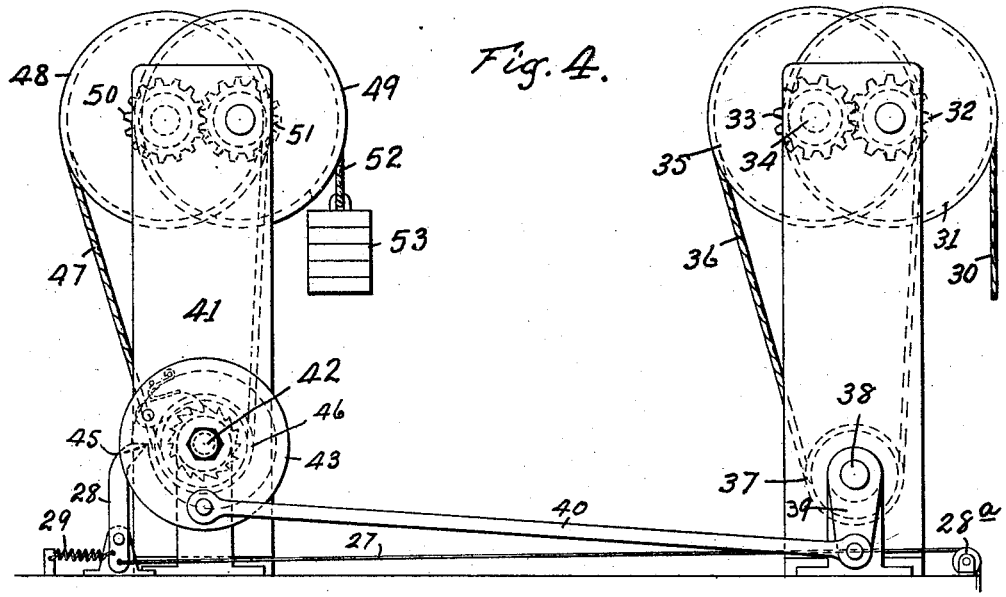
Figure 5:
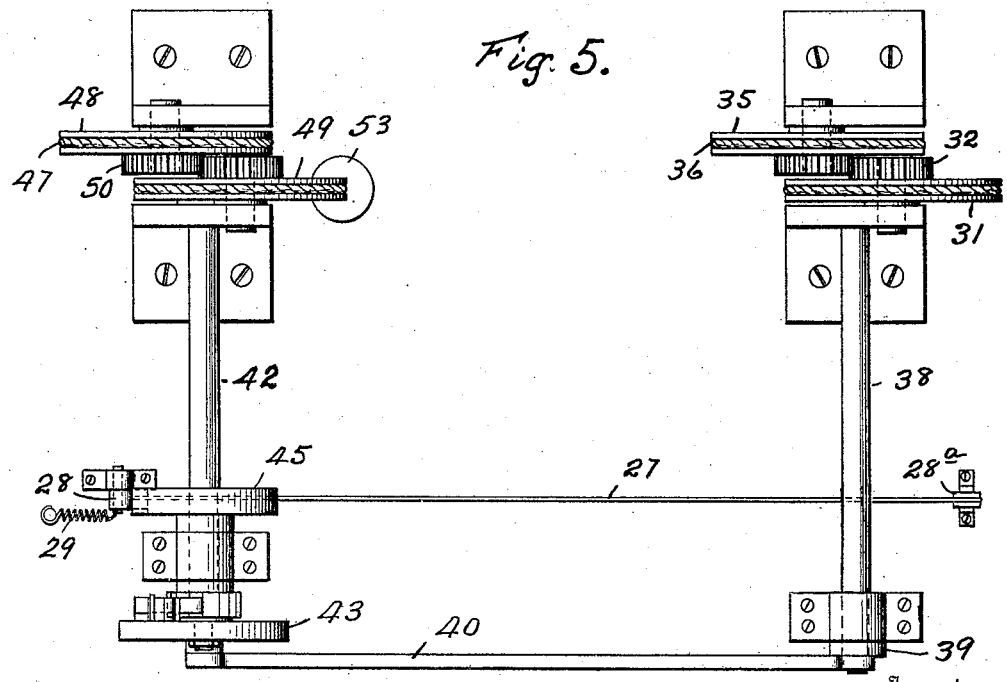

Figure 1 is a longitudinal sectional view of my trap. Fig. 2 is a sectional view on line X—X of Fig. 1. Fig. 3 is a sectional view on line Y—Y of Fig. 1. Fig. 4 is a side elevation of the knife raising mechanism. Fig. 5 is a plan view thereof. Fig. 6 is a detail view of the weight releasing device.

The numeral 1 designates the trap which is composed of three compartments, A, B and C. 2 indicates the entrance to the trap and this entrance is closed by sliding doors 3 which doors are provided with operating arms 4 to the lower ends of which are secured bevel gears 5 which mesh with gears 6 on a transverse rod 7. This rod is mounted in bearings 8 and has secured thereto a platform 9 the forward end of which is normally held down by springs 10 and a catch 10ª is adapted to engage and hold the rear end thereof when depressed.

The partition 11 between the compartments A and B is provided with an opening *b*, and on this partition is loosely hung a swinging door or closure 12 for said opening, adapted to swing into the compartment B. A rod 12ª is provided in this compartment in such a manner that the swinging of the door 12 will cause it to contact therewith and thereby release the catch 10ª, thus allowing the platform 9 to return to normal position.

The compartment A is also provided with a suitable bait hook 13.

When the animal enters the compartment A, its weight will depress the platform 9 and turn the rod 7 and through the gears 5 and 6 the operating arms 4 will be moved, closing the doors 3. At the same time the platform will be engaged and held in depressed position by the catch 10ª. The animal may then pass freely through the opening *b* in the partition 11 by reason of the door 12 swinging into the compartment B and when it has entered this compartment the door will fall and retain it therein. When the platform has been relieved of its engagement with the catch 10ª and of the animal's weight, as it passes into compartment B, the doors 3 will open, due to the action of the springs 10 which will raise the platform and reverse the action of the gears and arms 4. The trap is now ready for the next animal. The animal in compartment B, in its endeavor to find an exit therefrom, will attempt to pass through the opening 14 in the partition 15 leading to the compartment C. This action, that is, the putting of its head through the opening 14 will cause it to contact with a depending plate 16 which hangs in front of said opening and a slight pressure against said plate will move the crank arm 18 to which it is secured forward on its pivotal point 17 and draw the bolt 19 back. This bolt is suitably housed on the top of the trap, is connected by a cord to the crank arm 18 and is backed by a spring 20. The bolt normally engages the knife arm 21. This knife arm is provided with a knife 22 at its lower end which knife slides vertically in guides 23 between the partition 15 and the plate 16 and is provided with a cross-arm 24 through which it is held in tension by springs 25, secured to said arm at either end and to the trap floor.

It will be seen that when the bolt 19 is drawn back the knife will be drawn down quickly by the springs 25 and as the animal's head is directly beneath it, the lowering of the knife will decapitate it. When the knife falls, the cross arm 24 contacts with a block 26, suitably housed, and to which is connected a cord 27. This cord leads over a pulley 28ª on the top of the trap, and forward to a pawl 28, which pawl is normally held in position by a spring 29.

The knife arm 21 has secured to its top a strap 30, which passes over a pulley 31 mounted on the top of the trap, and this pulley carries a gear wheel 32. This gear meshes with another gear wheel 33 on a shaft 34 which shaft also carries a grooved wheel 35 on which a belt 36 runs. This belt also passes over a grooved pulley 37 located below the pulley 35 and is mounted on a shaft 38 on the end of which I secure a crank arm 39. To the free end of this crank arm I secure a connecting rod 40.

At the forward end of the trap I provide an upright 41 in which is mounted a shaft 42 carrying a wheel 43. This wheel is connected to the crank arm 39 by means of the connecting rod 40. On the shaft 42 is also secured a notched wheel 45, having a single notch which engages the pawl 28. This shaft also carries a grooved pulley 46 over which a belt 47 passes and to the top of the upright is secured a grooved pulley 48 over which the belt 47 also passes. A second grooved pulley 49 is also mounted on this upright and gear wheels 50 and 51 on these wheels mesh with each other. The pulley 49 is provided with a strap 52 and a weight 53 is secured to its end.

The action of the parts is as follows:— When the falling knife depresses the block 26, the cord 27 will withdraw the pawl from its connection with the toothed wheel 45. At the same time the weight 53 will fall, being released by this action of the pawl, and through the gears 50 and 51, revolve the pulley 49, belt 47 and shaft 42 carrying with it the wheel 43 and the toothed wheel 45. This wheel 45 will make a single revolution when it will be reëngaged by the pawl 28. The wheel 43 will, through the connecting rod 40 give a rocking movement to the crank arm 39 and through it and the pulley 37 cause the knife to raise until it snaps into engagement with the bolt 19, when the device will again be ready for action as before. This engagement of the knife with the bolt 19 takes place when the crank arm is at its extreme rear position, the rocking movement thereof being slightly less than a half circle, and the return of the crank arm to its forward position will reverse the movement of the wheels 31 and 35 and give sufficient slack to the strap 30 to permit the fall of the knife at the next operation.

It will be seen that a number of animals may be trapped in my device as the doors are automatically opened and closed by the animals themselves.

The compartments may, if desired, each be provided with suitable doors 55 for access thereto.

Having thus fully described my invention what I claim is;—

1. An animal trap having an entrance opening, sliding doors for closing said opening, a vertically movable platform, means connected to said platform for automatically opening and closing said doors, partitions in said trap dividing said trap into three compartments, each of said partitions having an opening therein, a swinging door secured to one of said partitions and adapted to close the opening therein, a vertically operating knife in close proximity to the opening in the second partition, springs secured to said knife to keep it under tension, a locking device for holding said knife in normal raised position, and means for automatically releasing said locking device.

2. An animal trap having an entrance opening, sliding doors for closing said opening, a platform movably mounted on a transverse shaft, bevel gears on said shaft, operating arms secured to said doors, gears connected with said operating arms adapted to mesh with the gears on said shaft, springs to keep said platform in normal raised position, partitions dividing said trap into three compartments, each of said partitions having an opening therein, a swinging door secured to one of said partitions adapted to close the opening therein, a vertically operating knife in close proximity to the opening in the second partition, springs secured to said knife to keep it under tension, a locking device for holding said knife in normal raised position, a depending plate in line with the opening in said second partition, a crank arm connected to said plate, and a locking bolt connected to said crank arm and engaging said knife.

In testimony whereof I affix my signature, in presence of two witnesses.

MILTON J. HILL.

Witnesses:
ED. A. KELLY,
CAMERON E. STRAUSS.